(12) United States Patent
Serebrin et al.

(10) Patent No.: US 10,126,966 B1
(45) Date of Patent: Nov. 13, 2018

(54) ROTATED MEMORY STORAGE FOR FAST FIRST-BIT READ ACCESS

(71) Applicant: GOOGLE INC., Mountain View, CA (US)

(72) Inventors: Benjamin Charles Serebrin, Mountain View, CA (US); Scott Johnson, Mountain View, CA (US); Timothy Chen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 303 days.

(21) Appl. No.: 15/247,626

(22) Filed: Aug. 25, 2016

Related U.S. Application Data (60) Provisional application No. 62/210,789, filed on Aug. 27, 2015.

(51) Int. Cl.
| | |
|---|---|
| G06F 3/06 | (2006.01) |
| G11C 16/32 | (2006.01) |
| G06F 21/52 | (2013.01) |
| G11C 16/28 | (2006.01) |

(52) U.S. Cl.
CPC .......... *G06F 3/0622* (2013.01); *G06F 3/0659* (2013.01); *G06F 3/0679* (2013.01); *G06F 21/52* (2013.01); *G11C 16/28* (2013.01); *G11C 16/32* (2013.01)

(58) Field of Classification Search
CPC ...... G06F 3/0622; G06F 21/52; G06F 3/0659; G06F 3/0679; G11C 16/32; G11C 16/28
See application file for complete search history.

(56) References Cited

U.S. PATENT DOCUMENTS

| | | | | |
|---|---|---|---|---|
| 4,309,755 | A * | 1/1982 | Lanty | H04M 9/003 710/21 |
| 2007/0115743 | A1 | 5/2007 | Sartori et al. | |
| 2010/0007377 | A1 | 1/2010 | Hing et al. | |
| 2012/0255010 | A1 * | 10/2012 | Sallam | G06F 21/572 726/24 |

(Continued)

FOREIGN PATENT DOCUMENTS

| | | | |
|---|---|---|---|
| WO | 2017046789 | 3/2017 | |
| WO | WO-2017046789 A1 * | 3/2017 | ............. G06F 21/50 |

OTHER PUBLICATIONS

U.S. Appl. No. 15/247,632, filed Aug. 25, 2016.

(Continued)

*Primary Examiner* — Michael Alsip
(74) *Attorney, Agent, or Firm* — Colby Nipper (57) ABSTRACT

A method for reading a first data bit from a non-volatile memory of a memory system is disclosed. The N most-significant bits are stored for each of M words in a rotated storage section. Address bits are serially received according to the clock signals. Before receiving a final address bit, a rotated word made up of the most significant bit of the M words is fetched from the rotated storage section. Address bits are serially received and rotated words are fetched until the N most-significant bits of the M words have been fetched. Then, un-rotated words are serially fetched from the non-volatile memory. Within one clock signal of the final address bit receipt, a bit is selected out of the fetched rotated words based on the received address bits. The first data bit is returned based on the selected bit and un-rotated words are returned based on the address.

11 Claims, 8 Drawing Sheets

(56) References Cited

U.S. PATENT DOCUMENTS

2018/0225230 A1* 8/2018 Litichever .............. G06F 21/56

OTHER PUBLICATIONS

U.S. Appl. No. 15/247,199, filed Aug. 25, 2016.
Vaid, "Microsoft's Project Olympus delivers cloud hardware innovation at scale", https://azure.microsoft.com/en-us/olog/microsofts-project-olympus-delivers-cloud-hardware-innovation-at-scale/, Nov. 8, 2017, 6 pages.
"Notice of Allowance", U.S. Appl. No. 15/247,199, dated Sep. 10, 2018, 14 pages.
"Notice of Allowance", U.S. Appl. No. 15/247,632, dated Oct. 9, 2018, 12 pages.

* cited by examiner

| | Address Bits | | Data Bits |
|---|---|---|---|
| 1  | 0x41240 | 1 | 1010010 |
| 2  | 0x41241 | 0 | 1110111 |
| 3  | 0x41242 | 1 | 0101000 |
| 4  | 0x41243 | 0 | 1101111 |
| 5  | 0x41244 | 0 | 0100101 |
| 6  | 0x41245 | 1 | 0110100 |
| 7  | 0x41246 | 0 | 1000101 |
| 8  | 0x41247 | 0 | 0000010 |
| 9  | 0x41248 | 0 | 1001001 |
| 10 | 0x41249 | 0 | 0110001 |
| 11 | 0x4124a | 1 | 0100111 |
| 12 | 0x4124b | 0 | 1100110 |
| 13 | 0x4124c | 0 | 0010101 |
| 14 | 0x4124d | 1 | 1101000 |
| 15 | 0x4124e | 0 | 0101111 |
| 16 | 0x4124f | 1 | 1101101 |
| 17 | 0x41250 | 1 | 1001110 |
| 18 | 0x41251 | 0 | 0111000 |
| 19 | 0x41252 | 0 | 1110010 |
| 20 | 0x41253 | 0 | 1101001 |
| 21 | 0x41254 | 1 | 0011110 |
| 22 | 0x41255 | 0 | 0101111 |
| 23 | 0x41256 | 0 | 1000111 |
| 24 | 0x41257 | 1 | 1101100 |
| 25 | 0x41258 | 1 | 0000100 |
| 26 | 0x41259 | 1 | 1001000 |
| 27 | 0x4125a | 1 | 0110000 |
| 28 | 0x4125b | 1 | 1001001 |
| 29 | 0x4125c | 0 | 1001101 |
| 30 | 0x4125d | 1 | 1001110 |
| 31 | 0x4125e | 1 | 0000001 |
| 32 | 0x4125f | 0 | 0111000 |

ROTATED MEMORY STORAGE FOR FAST FIRST-BIT READ ACCESS

This Nonprovisional application claims priority under 35 U.S.C. § 119(e) on U.S. Provisional Application No. 62/210,789 filed on Aug. 27, 2015, the entire contents of which are hereby incorporated by reference.

This application is related to application, U.S. patent application Ser. No. 15/247,199, and to application, U.S. patent application Ser. No. 15/247,632, which are incorporated by reference.

BACKGROUND

The present disclosure relates to an approach to meeting serial read timing as required by standard Serial Peripheral Interface (SPI) in an Electrically Erasable Programmable Read Only Memory (EEPROM), in which the EEPROM has added security functions. Aspects include a secure SPI EEPROM that is a drop-in replacement for a standard SPI EEPROM in which the SPI master chip is unaware of added security functions and techniques for accelerating a memory read command.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

Aspects include a method for reading a first data bit from a non-volatile memory of a memory system, the memory system having a master device that issues a read command to the non-volatile memory and issues clock signals, the command including an address, the method including: for M words stored in the non-volatile memory, storing N most-significant bits for each of the M words in a location of a rotated storage section in the non-volatile memory, where N and M are integers, and N is less than or equal to M; serially receiving address bits of the address in accordance with the clock signals; before receiving a final address bit of the address, fetching a rotated word made up of the most significant bit of the M words from the rotated storage section, serially receiving address bits of the address and fetching rotated words until the N most-significant bits of the M words have been fetched from the rotated storage section, and thereafter serially fetching un-rotated words from the non-volatile memory; receiving the final address bit of the address; within one clock signal of reception of the final address bit, selecting a bit out of the fetched rotated words based on the received address bits, and returning the first data bit to the master device based on the selected bit; and returning un-rotated words based on the address.

According to other aspects, the non-volatile memory may be an EEPROM and the read command may be an SPI normal read command.

According to further aspects, fetching rotated words and un-rotated words from the non-volatile memory may be performed in accordance with an internal clock signal that is different from the clock signal issued by the master device, and synchronization is performed between the internal clock signal and the master device clock signal.

According to yet further aspects, the step of fetching the rotated word may occur when the third address bit from the end of the address is received.

According to another embodiment, an apparatus for reading data bit from a non-volatile memory, the apparatus receiving a read command including an address to read the non-volatile memory and clock signals, the apparatus including a controller and a storage device storing instructions that are operable, when executed by the controller to cause the controller to perform operations comprising: for M words stored in the non-volatile memory, storing N most-significant bits for each of the M words in a location of a rotated storage section in the non-volatile memory, where N and M are integers, and N is less than or equal to M; serially receiving address bits of the address in accordance with the clock signals; before receiving a final address bit of the address, fetching a rotated word made up of the most significant bit of the M words from the rotated storage section, serially receiving address bits of the address and fetching rotated words until the N most-significant bits of the M words have been fetched from the rotated storage section, and thereafter serially fetching un-rotated words from the non-volatile memory; receiving the final address bit of the address; within one clock signal of reception of the final address bit, selecting a bit out of the fetched rotated words based on the received address bits, and returning a first data bit from the non-volatile memory to the master device based on the selected bit; and returning un-rotated words based on the address.

According to further aspects, the non-volatile memory device is an EEPROM and the apparatus is an SPI slave device communicating with the master device via a Serial Peripheral Interface.

According to yet further aspects a rotated storage section may be provided in the EEPROM, in which for M words stored in the EEPROM, N most-significant bits for each of the M words are stored in a location of the rotated storage section, where N and M are integers, and N is less than or equal to M, wherein rotated words are fetched in the rotated storage section.

According to a further embodiment a master-slave system including a master device, one or more slave memories, and a slave device between the master and at least one of the one or more slave memories, wherein the at least one of the one or more slave memories is a non-volatile memory, the master-slave system comprising: the master device, configured to transmit a command that includes address bits to the intermediary device and issue clock signals; the slave device configured to, serially receive address bits of the address in accordance with the clock signals; before receiving a final address bit of the address, fetch a rotated word made up of the most significant bit of M words from the non-volatile memory, serially receive address bits of the address and fetch rotated words until the N most-significant bits of the M words have been fetched from the non-volatile memory, and thereafter serially fetch un-rotated words from the non-volatile memory; receive the final address bit of the address; within one clock signal of reception of the final address bit, select a bit out of the fetched rotated words based on the received address bits, and return the first data bit to the master device based on the selected bit; and return un-rotated words based on the address.

According to another aspect, the non-volatile memory device is an EEPROM, the master device is an SPI master device, and the slave device is an SPI slave device communicating with the SPI master device via a Serial Peripheral Interface.

According to a yet further aspect, a rotated storage section may be provided in the EEPROM, in which for M words stored in the EEPROM, N most-significant bits for each of the M words are stored in a location of the rotated storage section, where N and M are integers, and N is less than or equal to M, wherein rotated words are fetched in the rotated storage section.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

These and other aspects are described with respect to the drawings. The teachings of the disclosed application can be readily understood by considering the following detailed description in conjunction with the accompanying drawings.

The figures depict embodiments for purposes of illustration only. One skilled in the art will recognize from the following discussion that alternative embodiments of the structures and methods illustrated herein may be employed without departing from the principles described herein.

DETAILED DESCRIPTION

The following description refers to the accompanying drawings. The following description is not intended to limit the scope. Instead, the scope is defined by the appended claims.

ACRONYMS

MISO—Master Input, Slave Output (Output from Slave).
MOSI—Master Output, Slave Input (output from Master).
SPI—Serial Peripheral Interface.
EEPROM—Electronically Erasable Programmable Read Only Memory.
FIFO—First In First Out.
<Secure Memory System>

EEPROM is a type of memory device that is compact and is generally faster than conventional disk drives as a non-volatile memory storage device. A fast and relatively inexpensive type of EEPROM is a serial EEPROM having a serial input pin. A serial EEPROM can interface with a serial bus, such as Serial Peripheral Interface (SPI). SPI devices communicate over the SPI bus using master-slave architecture. In the case of SPI EEPROM, an SPI master device communicates with one or more slave memory devices.

Figure 1:
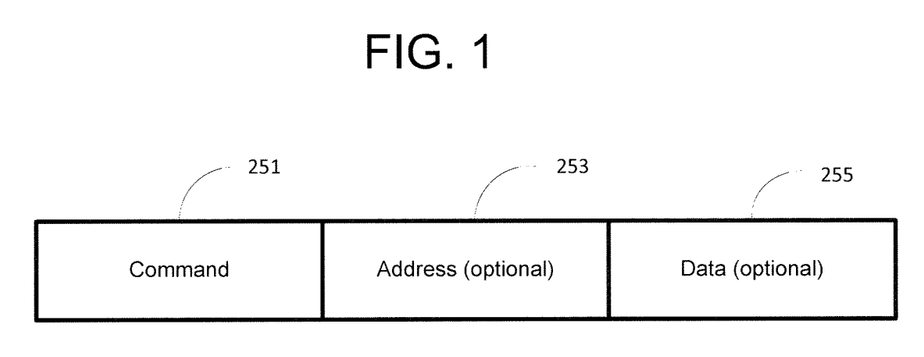
FIG. 1 is a table showing an SPI command format.

An SPI command is a command that is sent to a slave memory device as a bit-serial stream that includes bits representing the command, being sent most significant bit first, followed by an optional address, followed by optional write data, followed immediately by an optional read response. The format of an SPI command is shown in FIG. 1. The command format includes Command 251, Address 253 (optional), Data 255 (optional). The command 251 may be 8-bit, but may also be other sizes, such as 16-bit.

EEPROM devices, being a type of non-volatile memory, are generally used for storing and retrieving data intended for long-term storage. However, EEPROM devices may also be used as an alternative to conventional disk drive memory in a computer system, as the main non-volatile memory storage component. In some computer system environments, security measures may be desired as a layer of protection for the EEPROM device.

A serial EEPROM device that communicates over an SPI bus adheres to an SPI protocol. Thus, in the case that security measures are to be added, the modified EEPROM device should adhere to the existing protocol. An aspect is a secure memory system that replaces a standard SPI EEPROM such that the SPI master chip is unaware of the added security features or improved memory reading technniques.

In a standard SPI EEPROM, read commands do not have a wait state between command/address phase and data return phase. RAMs and ROMs cannot tell a master to wait so data must return on time. In the case of a normal read command, SPI command 0x03, the SPI EEPROM serially clocks in an address for the data read and expects the response data to begin immediately after receiving the command bits.

In one embodiment, a secure memory system may include 4 clock-crossing synchronizer cycles in the read path. These cycles require time to access memory and return the data. For some SPI read commands (eg. fast read), there may be a master dummy cycle (8 SPI clocks) between command and data phases. Such a dummy cycle may provide sufficient time to fetch data and return data. However, for the SPI read command 0x3, there is no master dummy cycle. Therefore, it is not be possible for the memory system to fetch data from memory in a conventional form.

An internal memory inside the secure memory system is not fast enough to return the response data at the high speed range of the SPI normal read command. Therefore, a solution is needed that can consistently return the first bit of the response data within the time expected for the SPI normal read command.

A possible solution may be to eliminate the clock synchronizers, which would reduce cycle time. However, this solution would subject the EEPROM to an external, untrusted clock source that may cause glitches. The secure memory system requires protection against clock glitches.

An alternative solution may be to begin a read from internal memory before the end of the address has arrived. For example, in the case of an internal memory having a width of N bytes, the read may begin when the address bits from the maximum-address bit to log 2(N)–1 have arrived. However, this solution may still not be fast enough to meet the requirements of the SPI normal read command.

Figure 2:
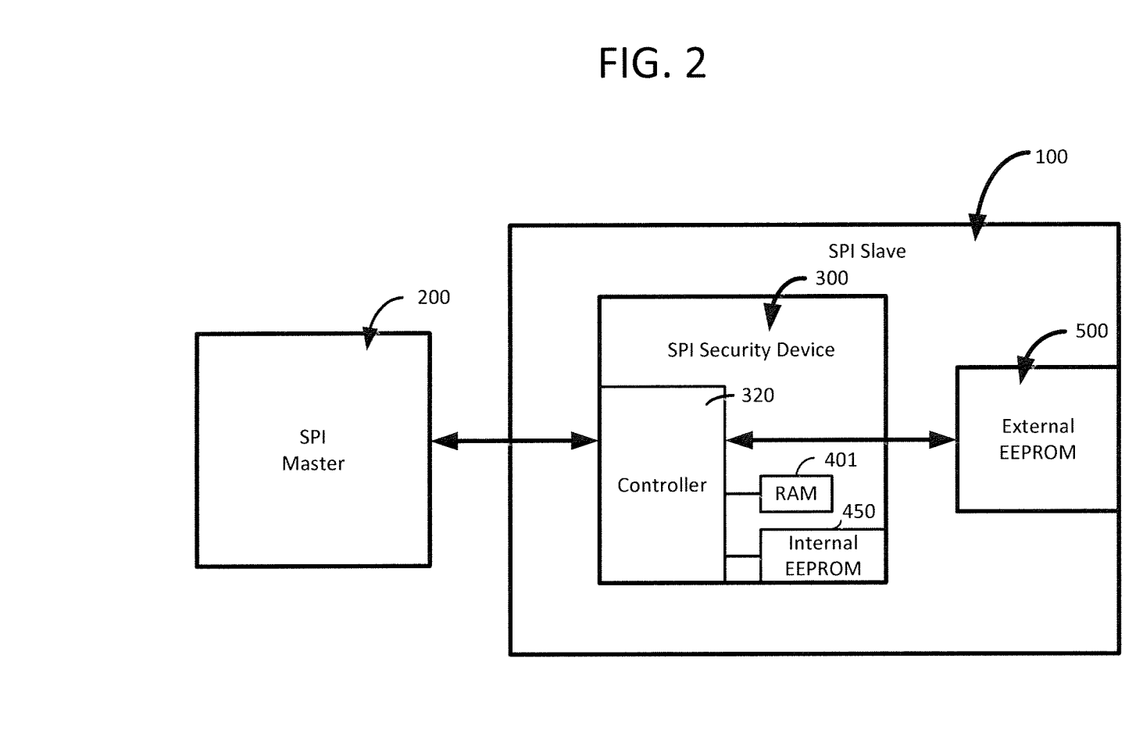
FIG. 2 is a block diagram for a SPI EEPROM system.

FIG. 2 is a block diagram for an SPI EEPROM system that may be a replacement for standard SPI EEPROM device according to an example embodiment. The SPI EEPROM system may communicate by way of an SPI bus that connects an SPI Master 200 to an SPI Slave 100. The SPI Slave 100 may include a security device 300 in addition to an on-chip Internal EEPROM 450, and an associated controller 320. The controller 320 may be a microcontroller that controls firmware. In addition, the SPI Slave 100 can be expanded to include an External EEPROM 500, as well as an on-chip RAM 401.

Provided the configuration of the secure memory system as shown in FIG. 2, SPI read commands may be processed differently, depending on which of the storage devices is being addressed. The controller 320 activates one of the RAM 401, Internal EEPROM 450, or External EEPROM 500 depending on the address.

SPI read commands for Internal EEPROM 450 require a configuration that can respond to the SPI normal read command immediately upon receiving the command. An aspect is to store an auxiliary copy of most significant bits of M words of data contents that are stored in the internal RAM or Internal EEPROM. The auxiliary copy may be used during a SPI normal read to accelerate access to the internal memory while the address bits of the command are arriving.

<Rotated Storage>

An aspect is to store an auxiliary copy of most significant bits rotated in a rotated storage. An example technique that is based on the rotated storage takes advantage of characteristics of the SPI normal read command.

Execution of read commands in SPI generally take the following phases:
Command Phase;
Address phase
Programmable Dummy Phase (8 SPI clocks);
Data Fetch.

The SPI read 0x3 command omits the Programmable Dummy Phase, and only includes the phases:
Command Phase;
Address phase
Data Fetch.

Unlike other SPI read commands, the SPI 0x3 read command needs the first data bit returned quickly, in particular immediately after the address phase, but outputs ensuing bits to an output stream very slowly. An aspect is a bit rotation technique that enables a secure SPI Slave device to meet the SPI 0x3 read requirement to immediately obtain the first data bit.

An aspect is to store N most significant bits (MSB) of data, rotated to the extent of one word in what is referred to as a rotated memory storage. The extent of a word of rotated bits depends on the width of an internal memory that is dedicated for use as the rotated memory storage. For example, for an internal memory that is 32 bits wide, the most significant bit of 32 adjacent bytes of the data image is stored in the rotated memory storage in the internal memory. In an example embodiment, bit 7 of every byte of the data contents is the most significant bit that is stored in a rotated storage location reserved for rotated data storage. Also, in order to meet timing requirements for SPI 0x3 read, two most-significant bits may be rotated and stored in the rotated storage location. However, bit rotation may be performed for any number of bits between 0 and 7, provided that timing requirements are met.

Figure 3:
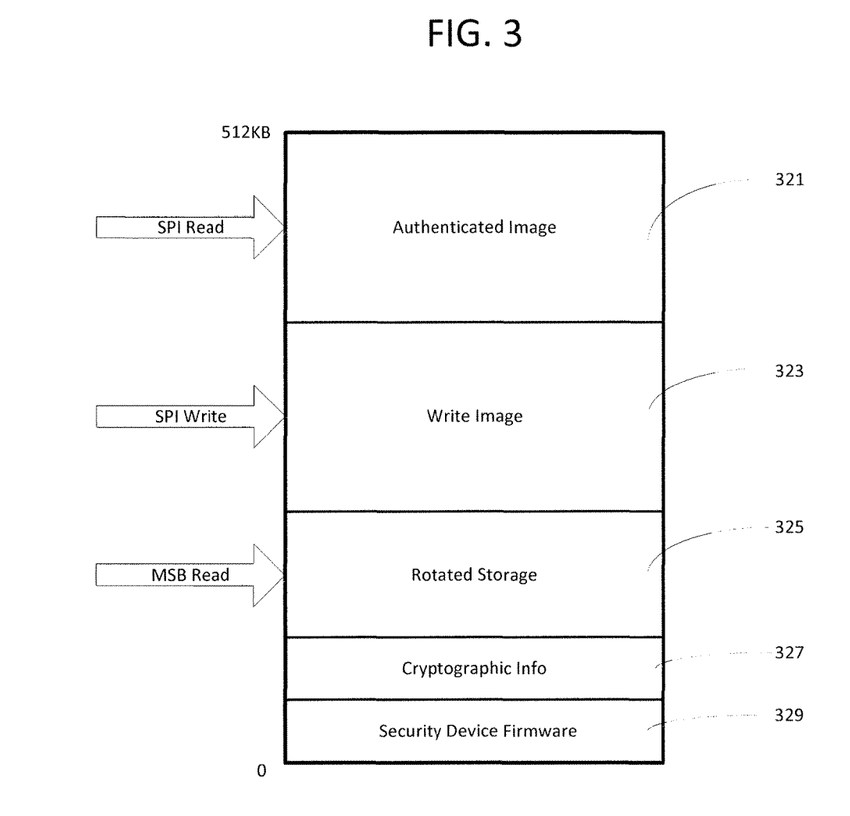
FIG. 3 is a memory arrangement for an internal memory.

A rotated copy of data may be created for an authenticated image. An aspect is that security device 300 may cryptographically check specific types of SPI commands. FIG. 3 is a memory arrangement for an internal memory for the security device 300. The security device 300 may itself be an SPI slave device in association with SPI Master 200. In a case that the SPI slave device 100 is an EEPROM, the internal memory for the security device 300 may be Internal EEPROM 450. In an example embodiment shown in FIG. 3, the internal memory accommodates 512 KB of M words. However, sizes of non-volatile memory devices may only be limited by available device sizes that can be incorporated into the security device, on-chip.

SPI read commands sent to the internal EEPROM 450 may be made in the address range containing an authenticated image 321. SPI write commands may be made in the address range reserved for an unauthenticated image, write image 323. Rotated storage 325 may be reserved for storage of rotated most significant bits of the authenticated image. Cryptographic information storage 327 may store cryptographic information needed for cryptographically checking specific SPI commands, and may include public keys. Firmware for the security device is stored in a section reserved for security device firmware 329.

Authentication of, for example, a write image may be performed by cryptographically checking write and other potentially destructive commands in controller 320. Once a write image in section 323 has been authenticated, it may be moved to the address range reserved for an authenticated image 321. The rotation process for most significant bits of the authenticated image 321 may be performed using the firmware in section 329, and in an example embodiment may be performed while the SPI Master device 200 is set to BUSY state.

Figure 4:
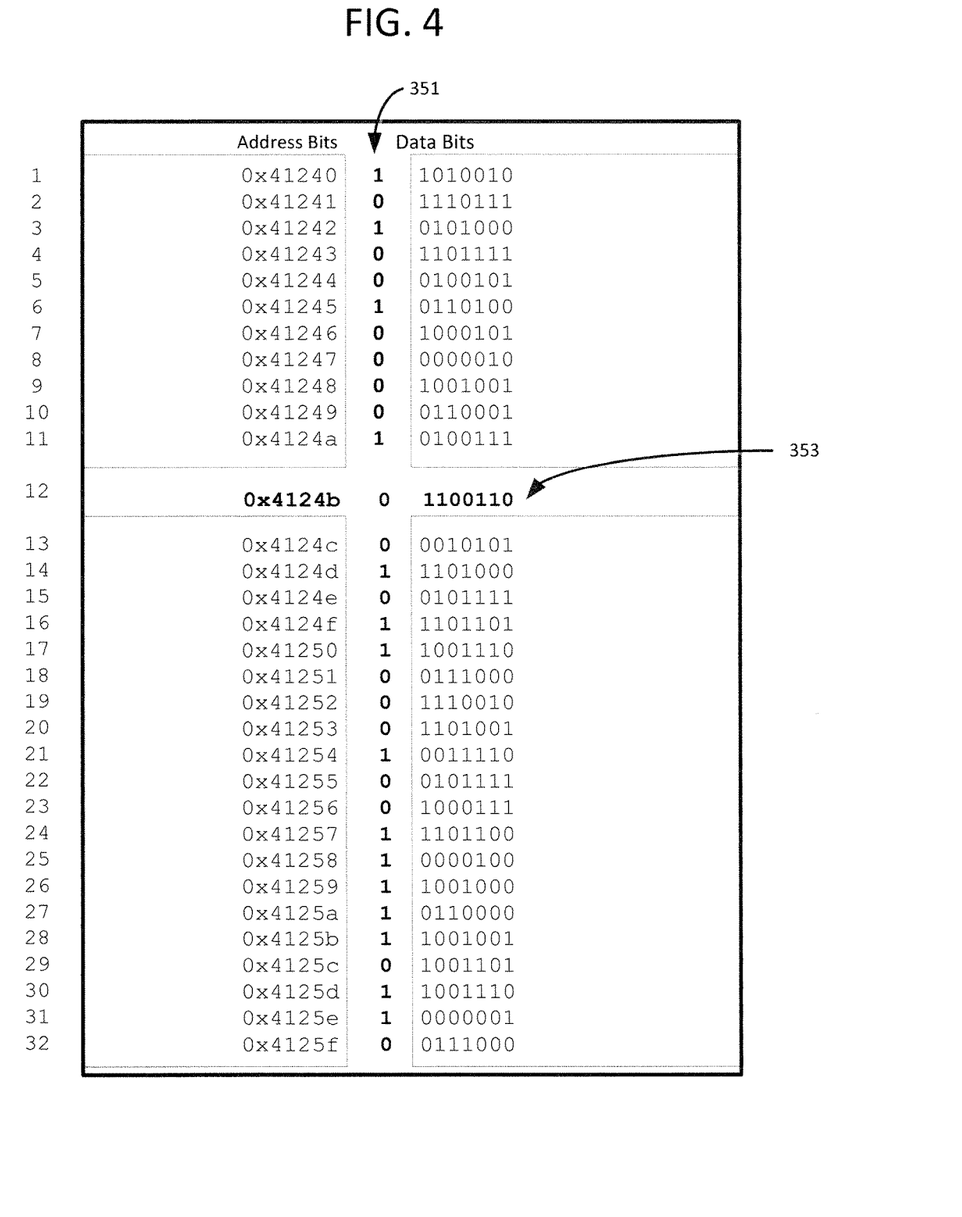
FIG. 4 is a table showing a first significant bit for bit rotation.

FIG. 4 provides an example of data bits that may be stored in the rotated memory storage 325. The example shows a case where there are five address bits to the end of the full address remaining to be received at the security device serial input. At this point, there are 32 possible bytes that could pertain to a normal read command (an address range of 0x41240 to 0x4125f). In this case, the Most Significant Bits (MSB) of these 32 bytes are stored in address msb0_addr=fa0(addr[31:5]), which is a function of the upper 27 bits. These 32 bytes represent one word in the rotated memory storage. In FIG. 4, the MSB of the 32 bytes is the middle column 351.

An example of a desired address 353 is shown in row 12, as five address bits 0x0004124b. In order to meet the requirements for a SPI 0x3 read command, it would be necessary to identify and return the MSB "0" to the SPI master device immediately after the address phase.

<SPI 0x3 Read>

Provided an example word size of 32 bits, a memory controller may begin fetching data when bit 5 of the address is received. In the example embodiment, after bit 5, in the range of addresses A4:A0 there would be a total of 32 possible bytes. Instead of waiting for the full address, the controller 320 may fetch a DATA WORD made up of the MSB of every byte in the range (32 entries*1 bit per entry) from a location in the rotated storage 325. In the example shown in FIG. 4, the MSB of the 32 bytes 351 may be fetched from a location in the rotated storage 325. Subsequently, the 32 bits can be returned to the SPI Master 200 so that they arrive by the time that the SPI master clock expects the first data bit to be returned, in particular the first clock cycle after address A0. Also, after bit 4 is received, there would be a total of 16 possible bytes. The controller then may fetch a data word (DWORD) made up of bits 6:5 of every byte in the range (16 entries*2 bits per entry) from a location in the rotated storage 325.

After receiving the top most 3 bits needed for output transmission, the controller 320 may then has sufficient time to fetch the real data from the un-rotated image 321. In some embodiments, only 2 bits are needed for the controller to fetch real data. As additional address bits arrive at the security device 300, SPI streaming read is performed such that a read access is issued to the un-rotated image 321 to return remaining data bytes.

When all address bits to address bit A0 are received, the exact byte address is known. Instead of fetching data from internal EEPROM 450, the controller 320 only needs to select the appropriate byte out of the real data and return it to the SPI data output pin of the security device 300. As shown, in an example embodiment, there may be 3 rotated bits, but one of ordinary skill in the art would appreciate that any number of bits may be rotated.

Figure 5:
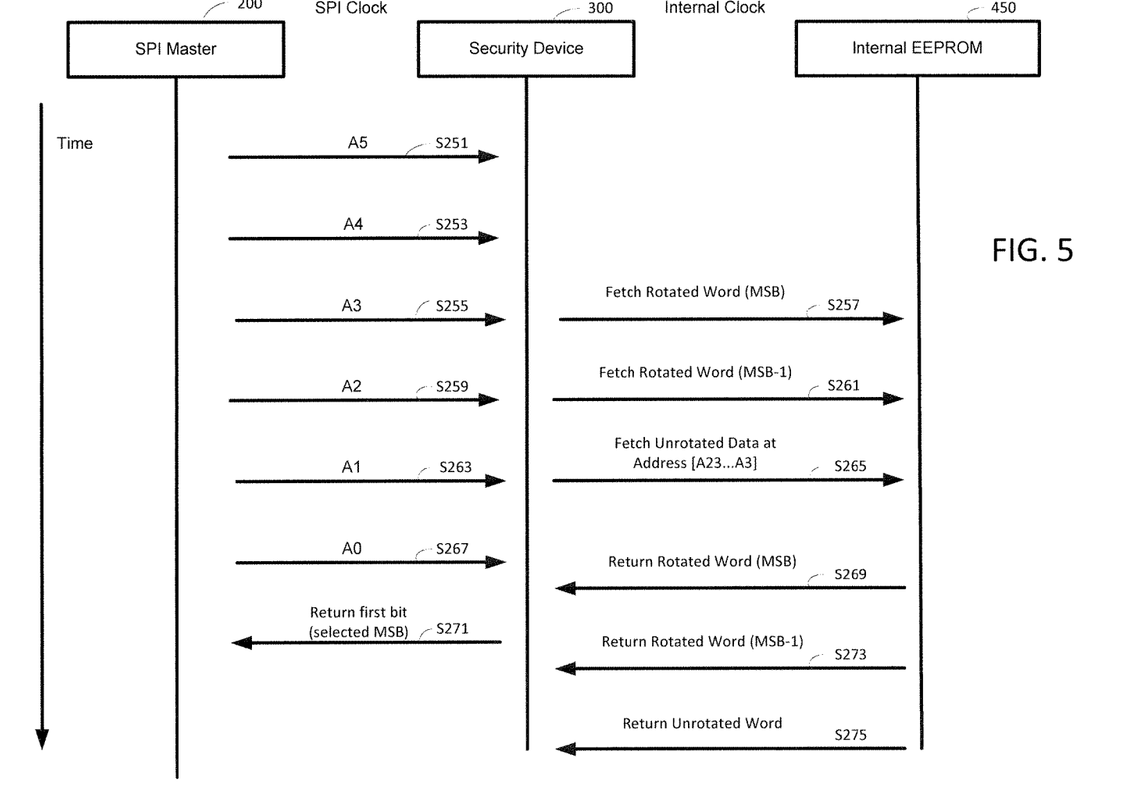
FIG. 5 is a sequence diagram.

An example of timing for the secure memory system for performing a SPI 0x3 read command is shown in a sequence diagram of FIG. 5. In FIG. 5, time is shown along a vertical axis, and pertains to events that occur between the SPI Master 200, security device 300 and internal EEPROM 450. The example shown in the diagram assumes that address bits through bit 6 have previously arrived. Bits output from the SPI Master 200 and input to the security device 300 are issued in accordance with the SPI clock supplied by the SPI Master 200. Bits output from the security device 300 to the internal EEPROM 450 may be issued in accordance with an internal clock.

At step S251, SPI address bit A5 arrives at the security device 300 from SPI Master 200. In an example embodiment, at this point address bits 23 through 5 are known. Thus, remaining address bits A4:A0 leave 32 possible bytes. At step S253, SPI address bit A4 arrives at the security device 300.

At step S255, SPI address bit A3 arrives at the security device 300 in accordance with the SPI clock. When address bit 5 arrives, in accordance with the internal clock the security device fetches a rotated word having 32 bits for the MSB at step S257 from the rotated storage location. In an example embodiment, the rotated storage is read at an offset equal to bits 23:5 of the known address, by using the bits as an index into an array of 32-bit values.

At step S259, SPI address bit A2 arrives at the security device 300. A next rotated word, referred to as MSB-1, is fetched at step S261 from a location in the rotated storage 325.

At step S263, SPI address bit A1 arrives at the security device 300. The un-rotated image 321 can begin being accessed. At step S265, un-rotated data at address A23 . . . A3 of the authenticated image 321 is fetched from internal EEPROM 450. By the time, at step S267, SPI address bit A0 arrives, at step S269, 32 bits in the rotated word for the MSB is returned from internal EEPROM 450. The rotated word may be any width, 32 bits is merely an example. The returned result is the actual data Then, at step S271, controller 320 selects the appropriate bit from the returned rotated word, and returns the first data bit to the SPI Master 200 in accordance with timing required for a SPI normal read command. In subsequent step S273, the rotated word for the MSB-1 is returned from the internal EEPROM 450 based on the internal clock. The returned result is bits 5/6 together of the addressed byte At step S275, the remaining data bits from the un-rotated image 321 are serially returned from the internal EEPROM 450 based on the internal clock.

Thus, in this example the storage of rotated most-significant bits allows for selection of the first bit, without having to fetch the first bit from the main copy in internal memory. Subsequently, the timing is such that the first data bit would be returned in time required by an SPI normal read command even in the case of delays used to accommodate an added internal clock domain.

<Processing by Security Device During Normal Read>

Figure 6:
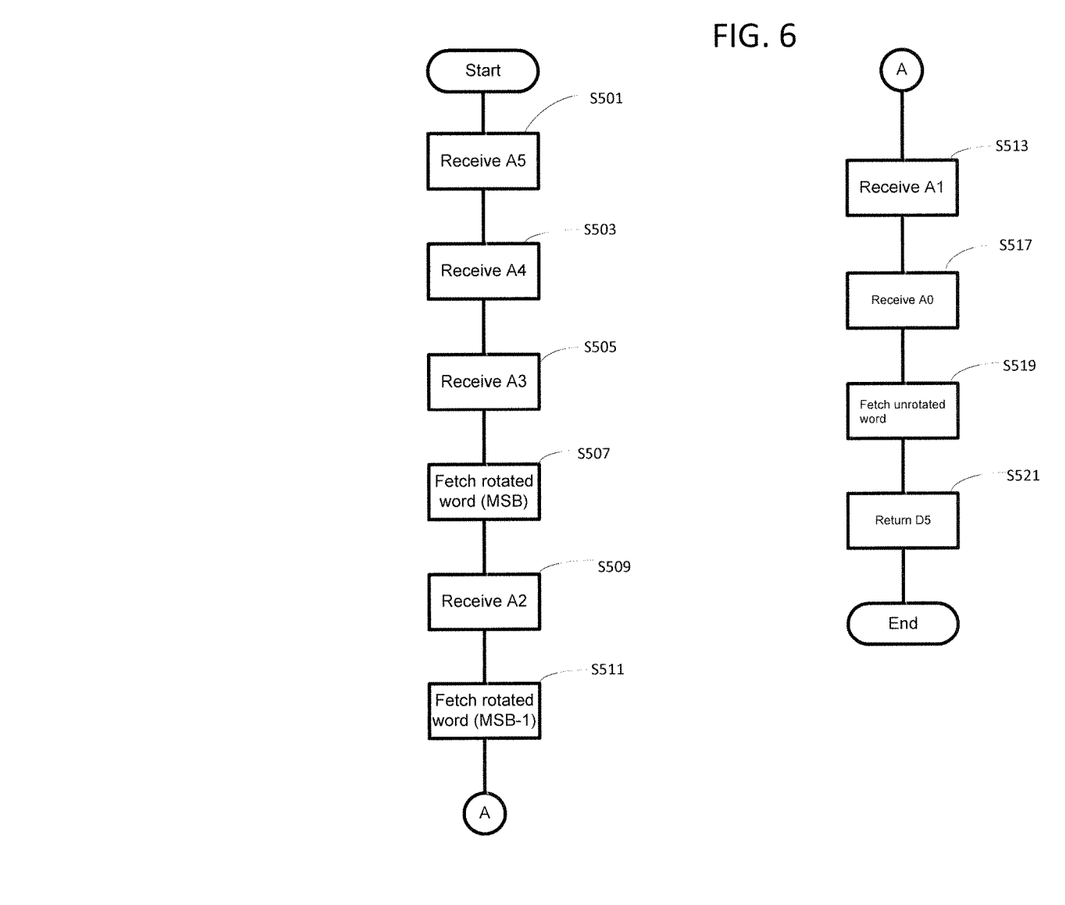
FIG. 6 is a flowchart for the SPI device in performing normal read.

FIG. 6 shows a flowchart for operations conducted by the security device 300 in performing an SPI normal read command. The steps in the flowchart correspond to steps pertaining to the security device 300 in the sequence diagram of FIG. 5.

Again, as in FIG. 5, FIG. 6 relates to an example in which it is presumed that address bits through bit 6 have previously arrived. At step S501, SPI address bit A5 arrives in accordance with the SPI clock. In an example embodiment, at this point, a range of the address is known down to 32 bytes. In an example embodiment, the security device 300 takes bits 23:5, shifts the bits right by 5 to give bits 18:0. Bits 18:0 are used as an index into an array of 32-bit values (rotated most-significant bits).

At step S503, SPI address bit A4 arrives in accordance with the SPI clock. The security device 300 begins fetching, based on the internal clock, the most-significant bits from the rotated memory location based on bits 18:0, at step S507. In the example embodiment, the most-significant bit is bit 7 of each byte within the the 32-byte range. The internal EEPROM 450 is read, based on the internal clock, at the rotated image address calculated from the address bits [High:6] to get the desired amount of rotated data. In an example embodiment, that may be 32 bits.

In the meantime, at step S505 SPI address bit A3 arrives in accordance with the SPI clock.

At step S509, SPI address bit A2 arrives in accordance with the SPI clock, while at step S511, the security device 300 begins fetching the second most-significant bits from the rotated memory location in accordance with the internal clock.

The SPI normal read command is such that beginning with receipt address bit A2, data fetches are made to the unrotated data image 321 by a read operation that is performed directly. When SPI address bit A0 arrives at step S517, all address bits have been received and the full byte address is known. The desired amount of bits of the MSB are returned from a location in the rotated storage 325 and arrive at data bit time 1 based on the SPI clock. The security device 300 fetches an unrotated word, at step S519.

At step S521, the security device 300 selects the appropriate bit, as data bit D7, out of the 32 bits of rotated data and returns D7 to the output pin of the security device 300, in time to meet SPI timing.

Data bit D6 is selected from data returned from a location in the rotated storage 325. Remaining data words are output by the security device 300 as they return from internal EEPROM 450.

<Secure Memory System>

As shown in FIG. 2, an aspect of an SPI slave device 100 is a capability of directing input commands to alternative memory components. Generally in an SPI communication system, control signals are issued by an SPI Master and data may be received by the SPI Master. Control signals may be applied to the MOSI line and data signals may be applied to the MISO line. Data may come in from the master or go to the master depending on which command is being executed and whether an example EEPROM is in single or dual mode. In addition, the SPI Master generates a serial clock signal to control timing of communication between the SPI Master and a SPI Slave device.

Figure 7:
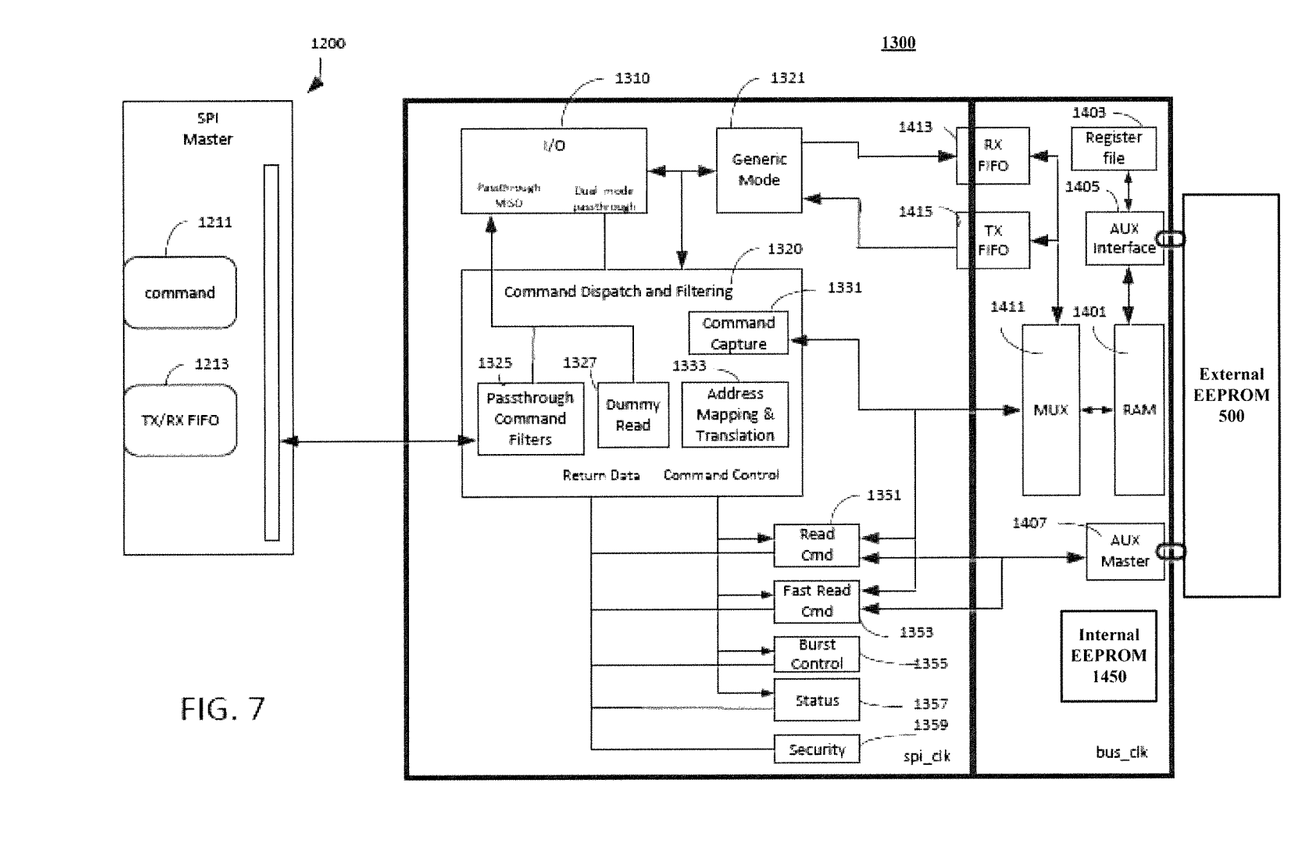
FIG. 7 is an exemplary configuration of an SPI EEPROM system having a security device.

FIG. 7 shows another embodiment of the SPI EEPROM. The SPI EEPROM memory system shown in FIG. 7 is intended to replace a standard SPI EEPROM. An approach to configuring the SPI EEPROM of FIG. 7 may be to use a conventional SPI Master to control communication with a SPI Slave device 1300 that has been enhanced with security functions in firmware. As an alternative, a SPI Slave device 1300 may include functions to operate as a proxy device for an External Slave device such as external EEPROM 500. The example embodiment shown in FIG. 7 provides both of an EEPROM mode and an EEPROM proxy mode in a single device. Alternative modes are enabled by way of command dispatch and filtering functions 1320. In addition, the single device is capable of optional control in dual mode. In dual mode, signals can be provided to the intermediate slave device using both the MISO and the MOSI lines.

The example embodiment in FIG. 7 includes SPI Master device 1200 and SPI Slave device 1300. The SPI Master device 1200 includes functions for issuing commands 1211, and TX/RX FIFO's 1213 for buffering output/input data. The SPI Master device 1200 may also be configured in the manner described above in relation to SPI Master device 200.

In the example embodiment, an SPI slave device 1300 may provide operations for an EEPROM (internal EEPROM 1450 and/or External EEPROM 500 in proxy mode). Core functions for the internal EEPROM 1450, referred to as an Internal EEPROM mode, are provided in Internal EEPROM Slave device 1300. Functions added as firmware may be provided in the SPI slave device 1300. Components within an SPI clock domain (left side of FIG. 7 to th left of the solid vertical line) operate under the SPI clock issued by the SPI Master 1200. The remainder of the components of the Internal EEPROM Slave device 1300 operate under a separate bus clock.

The Internal EEPROM Slave device 1400 includes an AUX Master port 1407, such as a GBX Master port, for access to the internal EEPROM 1450 and the external EEPROM 500. The internal EEPROM 1450 may be a Flash memory device and may be provided on the same chip as the other components of the SPI Slave device 1400. The external EEPROM 500 is a conventional EEPROM that may function as a slave in the proxy mode under control of SPI Master 1200. An external controller (e.g. for the external EEPROM 500) may be accessed by way of an AUX interface 1405, such as an AHB interface. The AUX interface 1405 can access the Register file 1403 and a local RAM 1401 as well as the external EEPROM 500. The Register file 1403 is a configuration file for the on-chip EEPROM and may also include a configuration file for the external EEPROM 500.

Data received or output in the EEPROM Slave device 1300 is performed using an RX FIFO 1413, for receiving data, and a TX FIFO 1415, for outputting data. The RX FIFO stores data that it receives into the local RAM 1401, while the TX FIFO obtains data from the local RAM 1401. Commands being uploaded and data transfer with the TX FIFO 1415 or RX FIFO 1413 may be regulated by MUX 1411.

In order to meet timing requirements of SPI EEPROM, the External EEPROM mode 325 can examine the incoming bitstream and either force certain commands into known-safe states, or allow non-destructive commands to travel through the security device 1300 unmodified. Non-destructive commands are a predetermined set of commands that can be allowed to pass through once a sufficient number of first bits identify the command. Otherwise, the certain commands undergo a command censoring process.

The command dispatch and filtering functions 1320 may include functions for passthrough command filters 1325, which may filter commands issued to the External EEPROM 500 based on programmable rules. As the SPI protocol does not allow commands to be buffered, these commands can be inspected on the fly by the dispatcher 1320 and forwarded to the External EEPROM 500. The command dispatch and filtering functions 1320 may include functions for censoring commands into a dummy read-like command 1327.

The command dispatch and filtering functions 1320 may include Address Mapping and Translation functions 1333. During EEPROM operations, the Address Mapping and Translation functions 1333 map external commands into any of 4 memory components based on address. The memory components may include on-chip RAM 1401, internal EEPROM 1450, External EEPROM 500, and on-chip registers or flip flops.

The command dispatch and filtering functions 1320 may include a command capture function 1331 that may decode commands and external virtual addresses so that the right component is activated for access.

Once the correct components are activated, the command dispatch and filtering functions 1320 may determine the correct return data content and inform the JO module 1310 in what format the data should be streamed to the originating master (normal, dual mode or passthrough).

The IO module 1310 may be an always on component and may be configured to accept external commands during low power and active states. The JO module 1310 can be configured to sample on either positive or negative edge, MSB first or LSB first.

In addition, there may be additional inputs for dual mode and passthrough. Dual mode indicates that for a particular transaction, both MOSI and MISO should be used to output return data, while passthrough indicates the return data can be directly output without security processing. Dual mode and passthrough are not static inputs, but change depending on the type of command that is received from external masters.

IO 1310 operates on the SPI clock and is asynchronous to the on-chip core, EEPROM Slave device 1300, which operates on a bus clock.

The SPI slave device 1300 may directly accesses on-chip memory to satisfy read commands. In order to meet the timing requirements of a SPI normal read command, the command dispatch and filtering functions 1320 can perform a bit rotation operation to gather early bits before making direct memory access.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The security device handles SPI read commands, fast read commands, write commands, status inquiries, and security identification. Read and fast read commands, depending on which address component is mapped, are handled differently. Read commands are performed using a Read Command Module 1351. Read commands to the Internal EEPROM 1450 utilize the memory rotation scheme. Read commands to RAM 1401 can be further subdivided into regions. Read commands intended for the External EEPROM 500 are not affected by the read module.

The fast read command module 1353 may behave the same between on-chip RAM 1401 and Internal EEPROM 1450. The fast read command module 1353 can be separately controlled from read command module 1351 in order to meet different timing states as required by the SPI protocol. In addition, the fast read command module 1353 also may form the basis of other variations of reads such as burst read, index read, and page read.

A burst write control module 1355 can control write commands, a status module 1357 can report status information, and a security identification module 1359 may identify security of a command.

Figure 8:
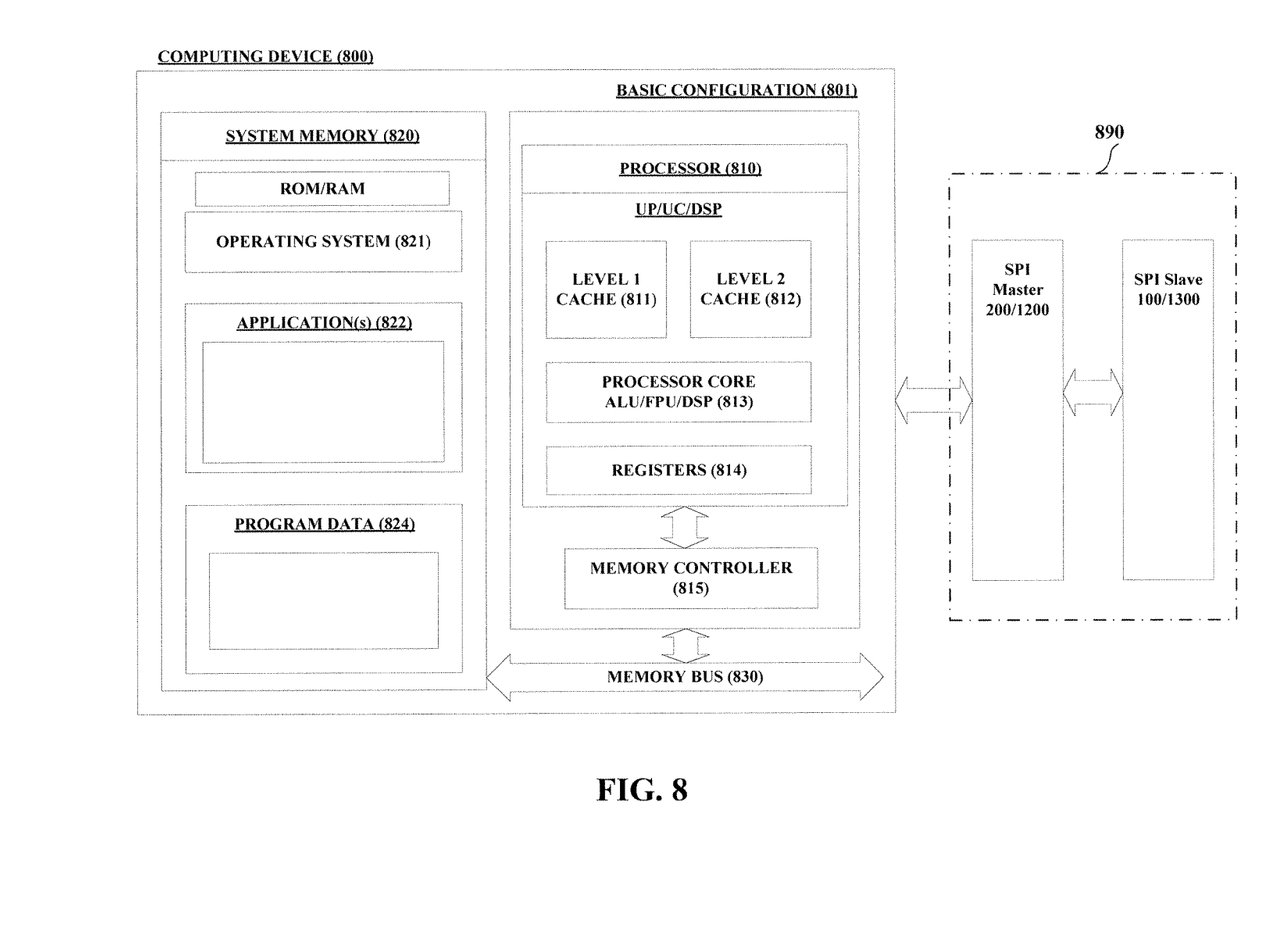
FIG. 8 is a block diagram of a a computer with an SPI EEPROM system.

FIG. 8 is a high-level block diagram of a conventional computer (800) the operation of which may be improved by the addition of SPI EEPROM 890. It is to be understood that SPI EEPROM 890 does not need to connect to a computer such as computer 800 and may work with other devices/chips such as hard drive controllers, SSD controllers, NICs, etc. The SPI EEPROM 890 may include an SPI master 200 and a SPI EEPROM Slave 100 as described in relation to FIG. 2 or SPI master 1200 and the SPI EEPROM slave 1300 as described in relation to FIG. 7.

In a very basic configuration (801), the computing device (800) typically includes one or more processors (810) and system memory (820). A memory bus (830) can be used for communicating between the processor (810) and the system memory (820).

The SPI EEPROM 890 may be connected to the computing device 800 via an SPI interface. It is to be understood, however, that one of ordinary skill in the art may adapt the SPI EEPROM to connect to computer 800 in various different conventional ways such as direct memory access and USB (Universal Serial Bus). In an alternative, the SPI EEPROM 890 may itself be incorporated into the computing device 800. The dashed lines around the SPI EEPROM 890 indicate optional separate packaging but it is to be understood the SPI EEPROM 890 may be constructed as one or more chips that may be part of the motherboard of computing device 800. All other conventional and to be developed connection and/or integration techniques may be utilized to combine the functionality of the computing device and the SPI EEPROM 890.

Moreover, the SPI EEPROM 890 enables SPI timings (e.g. including no wait state for the read command) to be retained and keeps the clock rate high thereby providing a faster device as compared with the conventional art. Furthermore, combining the SPI EEPROM with a conventional computing device 800 greatly improves the underlying functionality of the combined devices including accelerating reads of the EEPROM(s) 450, 1450, and/or 500 such that the response data to a read command is available more quickly. Such technical solutions may compensate for SPI read commands that do not have a wait state between command/address phase and data return phase. As such the SPI EEPROM 890 provides a technical solution with distinct technical advantages whether or not it is a stand-alone device or used in combination with a computer 800, hard drive controller, SSD controller, NIC, etc.

Depending on the desired configuration, the processor (810) can be of any type including but not limited to a microprocessor (μP), a microcontroller (μC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (815) can also be used with the processor (810), or in some implementations the memory controller (815) can be an internal part of the processor (810).

Depending on the desired configuration, the system memory (820) can be of any type including but not limited to volatile memory (such as RAM), non-volatile memory (such as ROM, flash memory, etc.) or any combination thereof. System memory (820) typically includes an operating system (821), one or more application(s) (822), and program data (824). The application (822) may include programs that request data from an SPI EEPROM 890. Program Data (824) may include storing instructions that requests data from an SPI EEPROM 890.

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (800) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of the present disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for reading data bit from a non-volatile memory of a memory system, the memory system having a master device that issues a read command to the non-volatile memory and issues clock signals, the command including an address, the method comprising:
   for M words stored in the non-volatile memory, storing N most-significant bits for each of the M words in a location of a rotated storage section in the non-volatile memory, where N and M are integers, and N is less than or equal to M;
   serially receiving address bits of the address in accordance with the clock signals;
   before receiving a final address bit of the address,
      fetching a rotated word made up of the most significant bit of the M words from the rotated storage section,
   serially receiving address bits of the address and fetching rotated words until the N most-significant bits of the M words have been fetched from the rotated storage section, and thereafter serially fetching un-rotated words from the non-volatile memory;
   receiving the final address bit of the address;
   within one clock signal of reception of the final address bit,
      selecting a bit out of the fetched rotated words based on the received address bits, and
      returning a first data bit from the non-volatile memory to the master device based on the selected bit; and
   returning un-rotated words based on the address.

2. The method of claim 1, wherein the non-volatile memory is an EEPROM and the read command is an SPI normal read command.

3. The method of claim 1, wherein fetching rotated words and un-rotated words from the non-volatile memory are performed in accordance with an internal clock signal that is different from the clock signal issued by the master device, and synchronization is performed between the internal clock signal and the master device clock signal.

4. The method of claim 1, wherein said step of fetching the rotated word occurs when the third address bit from the end of the address is received.

5. An apparatus for reading data bit from a non-volatile memory, the apparatus receiving a read command including an address to read the non-volatile memory and clock signals, the apparatus comprising:
   a controller and a storage device storing instructions that are operable, when executed by the controller to cause the controller to perform operations comprising:
      for M words stored in the non-volatile memory, storing N most-significant bits for each of the M words in a location of a rotated storage section in the non-volatile memory, where N and M are integers, and N is less than or equal to M;
      serially receiving address bits of the address in accordance with the clock signals;
      before receiving a final address bit of the address,
         fetching a rotated word made up of the most significant bit of the M words from the rotated storage section,
      serially receiving address bits of the address and fetching rotated words until the N most-significant bits of the M words have been fetched from the rotated storage section, and thereafter serially fetching un-rotated words from the non-volatile memory;
      receiving the final address bit of the address;
      within one clock signal of reception of the final address bit,
         selecting a bit out of the fetched rotated words based on the received address bits, and
         returning a first data bit from the non-volatile memory to the master device based on the selected bit; and
      returning un-rotated words based on the address.

6. The apparatus of claim 5, wherein the non-volatile memory device is an EEPROM and the apparatus is an SPI slave device communicating with the master device via a Serial Peripheral Interface.

7. The apparatus of claim 6, further comprising a rotated storage section in the EEPROM, in which for M words stored in the EEPROM, N most-significant bits for each of the M words are stored in a location of the rotated storage section, where N and M are integers, and N is less than or equal to M, wherein rotated words are fetched in the rotated storage section.

8. A master-slave system including a master device, one or more slave memories, and a slave device between the master and at least one of the one or more slave memories, wherein the at least one of the one or more slave memories is a non-volatile memory, the master-slave system comprising:
   the master device, configured to transmit a command that includes address bits to the intermediary device and issue clock signals;
   the slave device configured to,
      serially receive address bits of the address in accordance with the clock signals;
      before receiving a final address bit of the address,
         fetch a rotated word made up of the most significant bit of M words from the non-volatile memory,
      serially receive address bits of the address and fetch rotated words until the N most-significant bits of the M words have been fetched from the non-volatile memory, and thereafter serially fetch un-rotated words from the non-volatile memory;
      receive the final address bit of the address;
      within one clock signal of reception of the final address bit,
         select a bit out of the fetched rotated words based on the received address bits, and
         return the first data bit to the master device based on the selected bit; and
      return un-rotated words based on the address.

9. The master-slave system of claim 8, wherein the non-volatile memory device is an EEPROM, the master device is an SPI master device, and the slave device is an SPI slave device communicating with the SPI master device via a Serial Peripheral Interface.

10. The master-slave system of claim 9, further comprising a rotated storage section in the EEPROM, in which for M words stored in the EEPROM, N most-significant bits for each of the M words are stored in a location of the rotated storage section, where N and M are integers, and N is less than or equal to M, wherein rotated words are fetched in the rotated storage section.

11. A computer, comprising:
a processor;
system memory; and
the master-slave system of claim 8.

\* \* \* \* \*